US006926015B2

(12) United States Patent
Garcia, Jr. et al.

(10) Patent No.: US 6,926,015 B2
(45) Date of Patent: *Aug. 9, 2005

(54) METHOD OF WASHING PRODUCE

(76) Inventors: Jose Luis Garcia, Jr., 1450 Atlantic Ave., Yuma, AZ (US) 85365; Carlos Alberto Alonzo, 7455 E. 24 La., Yuma, AZ (US) 85365

(*) Notice: Subject to any disclaimer, the term of this patent is extended or adjusted under 35 U.S.C. 154(b) by 0 days.

This patent is subject to a terminal disclaimer.

(21) Appl. No.: 10/663,175

(22) Filed: Sep. 16, 2003

(65) Prior Publication Data

US 2004/0050404 A1 Mar. 18, 2004

Related U.S. Application Data

(63) Continuation of application No. 09/854,536, filed on May 15, 2001, now Pat. No. 6,626,192.

(51) Int. Cl.$^7$ .................................................. B08B 3/02
(52) U.S. Cl. ........................ 134/25.3; 134/32; 134/131; 134/133; 134/34
(58) Field of Search ............................ 134/25.3, 32, 34, 134/131, 133

(56) References Cited

U.S. PATENT DOCUMENTS

| | | | | | |
|---|---|---|---|---|---|
| 3,155,102 | A | * | 11/1964 | Niederer, Jr. et al. | ......... 134/72 |
| 4,502,893 | A | * | 3/1985 | Dietrich | ....................... 134/10 |
| 5,451,266 | A | * | 9/1995 | Kirk et al. | ................. 134/25.3 |
| 5,820,694 | A | * | 10/1998 | St. Martin | ................. 134/25.3 |
| 6,196,237 | B1 | * | 3/2001 | Brown et al. | .............. 134/25.3 |
| 6,298,865 | B1 | * | 10/2001 | Brown et al. | .............. 134/25.3 |
| 6,626,192 | B2 | * | 9/2003 | Garcia et al. | .............. 134/25.3 |
| 2003/0126850 | A1 | * | 7/2003 | Brown | ...................... 56/327.1 |

* cited by examiner

Primary Examiner—Zeinab El-Arini
(74) Attorney, Agent, or Firm—Jeffrey Weiss; Weiss, Moy & Harris, P.C.

(57) ABSTRACT

A produce washing method, which permits the washing of produce from both above and below in the field. The produce washing takes produce along a conveyor belt, from a loading section, to a washing section on which is located a washing unit, upward along an ascending section, and from there the produce travels along a dumping section and into a receptacle. The washing unit features spray nozzles located above and below the washing section, so as to direct spray from above and below the produce so as to more effectively wash it.

6 Claims, 2 Drawing Sheets

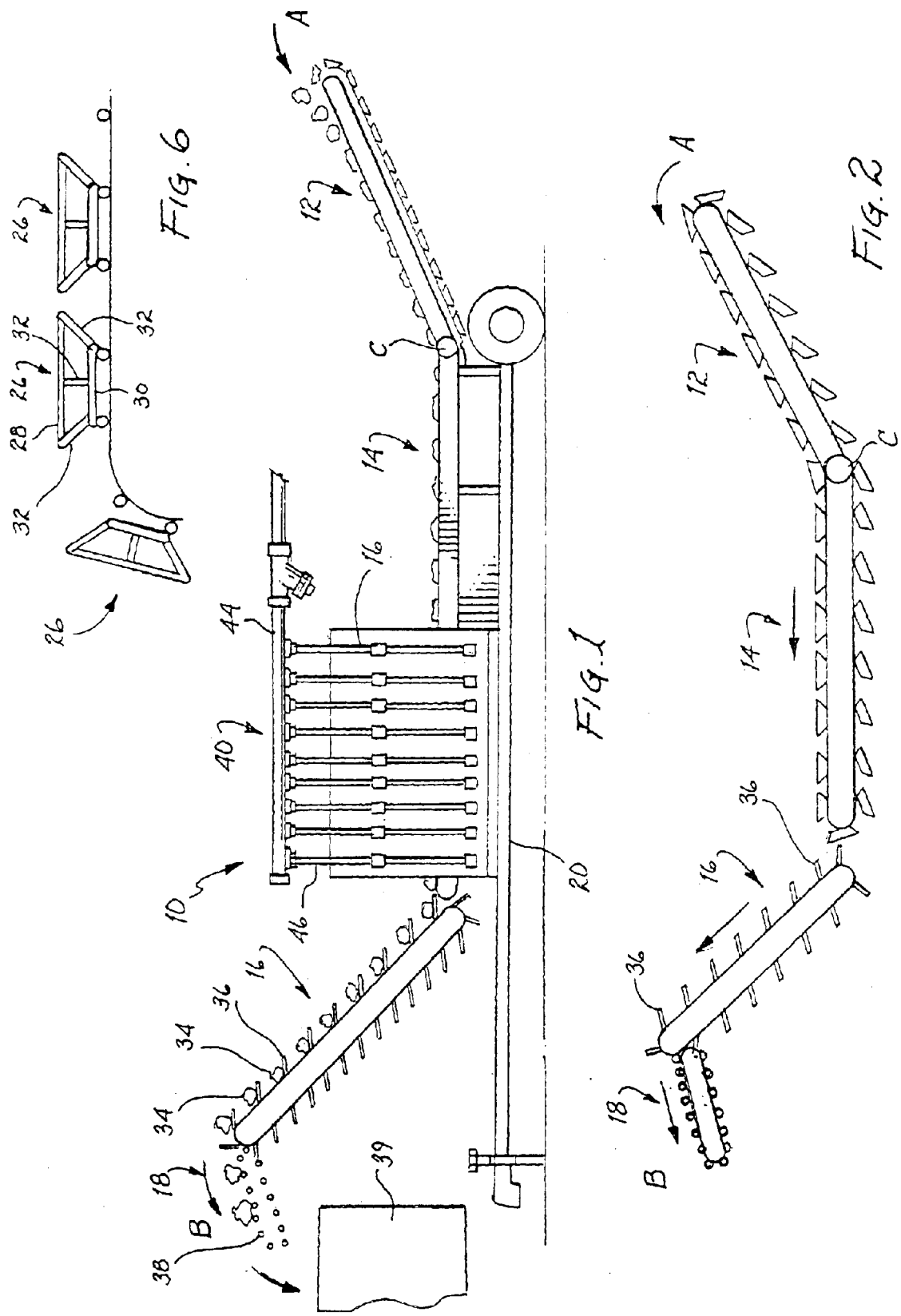

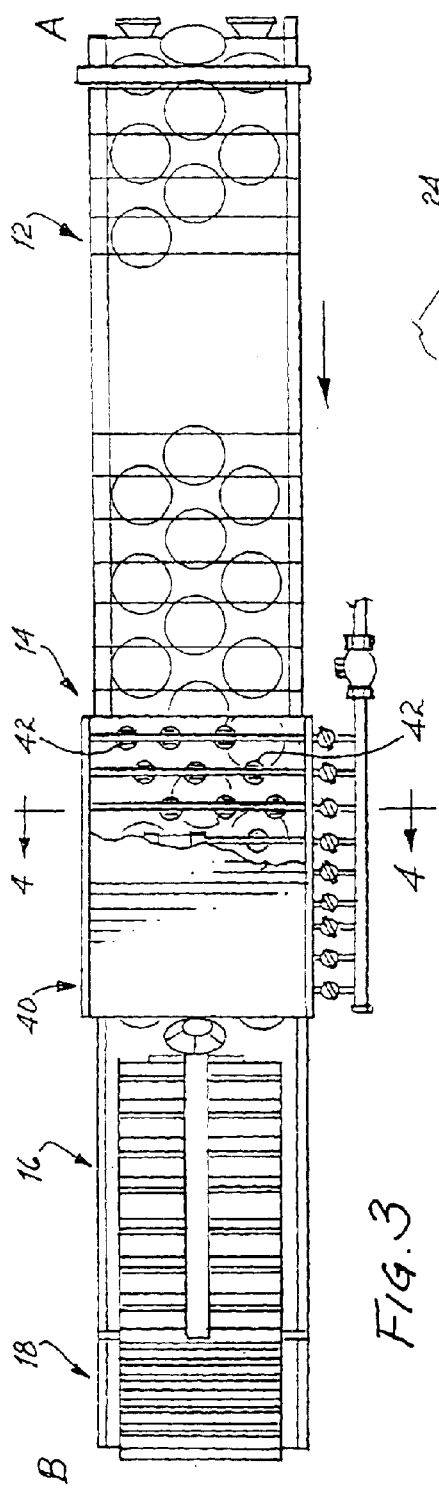
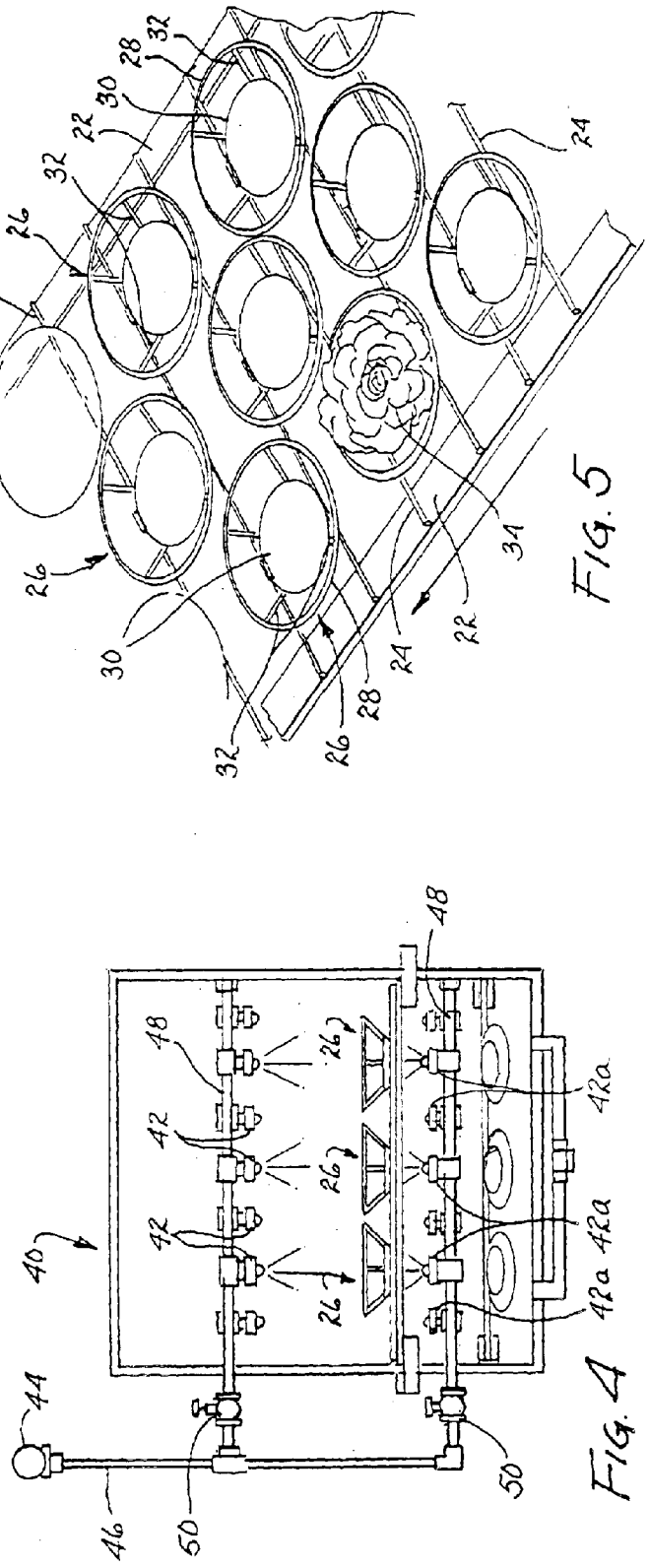

METHOD OF WASHING PRODUCE

This is a continuation of U.S. patent application Ser. No. 09/854,536, filed May 15, 2001, which is now U.S. Pat. No. 6,626,192, and to which priority is claimed.

BACKGROUND OF THE INVENTION

1. Field of the Invention

This invention relates generally to apparatuses and methods for cleaning produce in the field and, more specifically, to an apparatus and method for washing produce (including preferably lettuce) from the top and bottom and then loading the cleaned produce into a desired receptacle, such as a truck.

2. Background of the Invention

In the harvesting of lettuce, it is desirable to, as quickly and efficiently as possible, pick the lettuce, wash the lettuce, and position it for transport away from the field for further processing.

A number of different apparatuses have been developed over the years for cleaning harvested vegetables and fruits. Some of these, such as the "Produce Washer and Washing Method" disclosed in U.S. Pat. No. 5,820,694, are of a type not suited for use in the field where the vegetables and fruits are harvested. The use of such a washer is relatively inefficient, inasmuch as the washing of the produce cannot proceed as a step in the harvesting of the produce and its loading to a truck or other receptacle to be shipped away from the field for further processing.

U.S. Pat. No. 5,451,266 discloses a method for spray washing fruit in a brush bed. This method has the advantage that it washes produce in the field; however, it exposes the washed produce only to a spray coming from above the fruit. In order to provide a more complete wash, the method disclosed in U.S. Pat. No. 5,451,266 must provide rotating cylindrical brushes. This requirement increases the complexity of the apparatus, making it relatively expensive to manufacture and difficult to use.

There continues to be a need for an apparatus and method for effectively cleaning produce in the field. The apparatus and method should clean the produce from the top and the bottom without the need for brushes or like devices. The present invention satisfies these needs and provides other, related, advantages.

SUMMARY OF THE INVENTION

It is an object of the present invention to provide an apparatus and method for effectively cleaning produce, including particularly lettuce in the field.

It is a further object of the present invention to provide an apparatus and method for cleaning produce, including particularly lettuce, in a field setting both from the top and the bottom.

BRIEF DESCRIPTION OF THE PREFERRED EMBODIMENTS

In accordance with one embodiment of the present invention, a produce washing apparatus is disclosed. The apparatus comprises, in combination: a washing section having a washing unit disposed thereon so as to position spray nozzles both above and below the washing section; and a conveyor belt apparatus located on the washing section and adapted to transport produce through the washing unit from an entry point of the washing section to a terminating point of the washing section; wherein the conveyor belt apparatus further comprises produce receiving baskets adapted to receive the produce and to expose both a top portion and a bottom portion of the produce to spray emanating from each of the spray nozzles located above the washing section and the spray nozzles located below the washing section.

In accordance with another embodiment of the present invention, a produce washing apparatus is disclosed. The apparatus comprises, in combination: a washing section having a washing unit disposed thereon so as to position spray nozzles both above and below the washing section; a conveyor belt apparatus located on the washing section and adapted to transport produce through the washing unit from an entry point of the washing section to a terminating point of the washing section; wherein the conveyor belt apparatus located on the washing section further comprises produce receiving baskets adapted to receive the produce and to expose both a top portion and a bottom portion of the produce to spray emanating from each of the spray nozzles located above the washing section and the spray nozzles located below the washing section; a loading section pivotally coupled to the washing section at the entry point of the washing section; a conveyor belt apparatus located on the loading section and adapted to transport produce along the loading section from an entry point of the loading section to a terminating point of the loading section and from there to the* entry point of the washing section; an upward angled ascending section positioned at the terminating point of the washing section, after the washing unit; a conveyor belt apparatus located on the ascending section and adapted to transport produce along the ascending section from an entry point of the ascending section to a terminating point of the ascending section; wherein the conveyor belt apparatus located on the ascending section further comprises a plurality of steps located thereon and dimensioned to prevent the produce from falling backward as it travels upward along the ascending section; a downward angled dumping section positioned at the terminating point of the upward angled ascending section; a conveyor belt apparatus located on the dumping section and adapted to transport produce along the dumping section from the terminating point of the ascending section to a terminating point of the dumping section; and a trailer coupled to the produce washing apparatus.

In accordance with still another embodiment of the present invention, a method for washing produce is disclosed. The method comprises the steps of: providing a washing section having a washing unit disposed thereon so as to position spray nozzles both above and below the washing section; providing a conveyor belt apparatus located on the washing section and adapted to transport produce through the washing unit from an entry point of the washing section to a terminating point of the washing section; wherein the conveyor belt apparatus further comprises produce receiving baskets adapted to receive the produce and to expose both a top portion and a bottom portion of the produce to spray emanating from each of the spray nozzles located above the washing section and the spray nozzles located below the washing section; placing produce in the produce receiving baskets; passing the produce receiving baskets with the produce therein through the washing unit; exposing the top portion and the bottom portion of the produce to spray emanating from each of the spray nozzles located above the washing section and the spray nozzles located below the washing section.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a side view of the produce washing apparatus of the present invention.

FIG. 2 is a side view of the conveyor portion of the produce washing apparatus of FIG. 1.

FIG. 3 is a top, partially cut-away, view of the produce washing apparatus of FIG. 1.

FIG. 4 is an end view of the washing area portion of the produce washing apparatus of FIG. 1.

FIG. 5 is a perspective view of the produce basket portion of the produce washing apparatus of FIG. 1.

FIG. 6 is a side view of the produce basket portion of the produce washing apparatus of FIG. 1, illustrating the path followed by the produce baskets during operation.

DETAILED DESCRIPTION OF THE PREFERRED EMBODIMENTS

Referring first to FIG. 1, the produce washing apparatus 10 ("apparatus 10") of the present invention is shown. The apparatus 10 transports produce to be washed along a conveyor that proceeds from entry point A to exit point B. Referring also to FIG. 2, the apparatus 10 can be seen to preferably comprise four sections: a loading section 12, a washing section 14, an ascending section 16, and a dumping section 18. The entire apparatus 10 is preferably mounted on a trailer 20, which may be coupled to a vehicle having an appropriate hitching device (not shown) so as to permit the apparatus 10 to be readily transported to and from the field and to different areas in a particular field.

The loading section 12 and washing section 14 preferably articulate with respect to one another, about point C. This articulation allows the loading section 12 to be positioned at a desired height for the loading of the produce thereon.

Attention is now directed to FIGS. 5 and 6. Travelling the length of the loading section 12 and washing section 14 is a conveyor belt apparatus, consisting preferably of chain belts 22, to which are attached and between which are positioned rods 24. To the rods 24 are coupled produce baskets 26, so that each basket 26 sits between and is coupled to two rods 24. As shown in FIG. 5, the baskets 26 are preferably positioned along the rods 24 so as to form alternating rows of one and two baskets 26.

Each basket 26 preferably comprises an upper ring 28, a base ring 30 having a smaller diameter than the upper ring 28, and support members 32 projecting from the base ring 30 to the upper ring 28. (There are preferably four, substantially equidistant support members 32 interposed between the upper ring 28 and base ring 30.) The baskets 26 should be dimensioned to accommodate the produce with which the apparatus 10 is to be used. As shown in FIG. 5, where the produce is lettuce 34, the upper ring 28 should have a circumference larger than that of a typical head of lettuce 34, while the base ring 30 should have a base ring 30 with a circumference smaller than that of a typical head of lettuce 34. In this fashion, the lettuce 34 can be positioned within the basket 26 in a relatively secure manner, and, as discussed more fully below, water may pass through the baskets 26 so as to contact the lettuce 34. (While the apparatus 10 is preferably used with lettuce 34, it should be understood that it could be used with other vegetables and fruits that are harvested from a field and that would benefit from a washing step.)

Still referring to FIG. 5, in the preferred embodiment, the upper ring 28 forms only a partial circle ending at two of the support members 32, so that a front portion of the upper ring 28 is left open. This permits produce to be more readily dumped from the basket 26 at the end of the washing section 14, and acts to prevent produce from becoming stuck in the basket 26 and potentially becoming damaged or interfering with the operation of the apparatus 10.

As shown in FIGS. 2 and 6, as the baskets 26 reach the end of the washing section 14, they pass to the underside of the washing section 14 and continue past the underside of the loading section 12 to point A, at which position they return to an upward orientation along the top of loading section 12.

As shown in FIGS. 1 and 2, the ascending section 16 features steps 36, which are dimensioned to receive the produce—such as heads of lettuce 34—as they are emptied from the baskets 26 at the end of the washing section 14. As shown in more detail in FIG. 2, the steps 36 are preferably angled slightly upward, so as to prevent the produce from falling backward onto the washing section 14. The steps 36 carry the produce upward toward the dumping section 18, which preferably features a simple conveyor belt surface 38. Because the dumping section 18 is angled in a downward direction from the apex of the ascending section 16, there is no need for baskets or steps to maintain the produce in position as it is moved forward. At the terminus of the dumping section 18, at exit point B, the produce is dumped into a receptacle 39, which may be a truck bed or other suitable vessel.

Attention is now directed to FIGS. 1, 3 and 4. Along the washing section 14 is located a washing unit 40. The washing unit 40 is disposed around a portion of the washing section 14, and positions spray nozzles 42, directly above and spray nozzles 42a directly below the washing section 14. Water is transported to the spray nozzles 42 and 42a via a main supply line 44, which in turn feeds water down vertically oriented feeder lines 46, from which the water is then routed to horizontally oriented feeder lines 48, and from there to the spray nozzles 42 and 42a. (As shown in FIGS. 3 and 4, the spray nozzles 42 and 42a are preferably staggered so as to provide more effective spray coverage.) Shut-off valves 50 are preferably positioned on the horizontally oriented feeder lines 48, so that the flow of water to the spray nozzles 42 or 42a can be terminated, if desired.

Statement of Operation

The first step in using the apparatus 10 would be to position the apparatus 10 in the desired location—presumably in the field but also possibly in a non-field setting. This may be accomplished by coupling the trailer 20 upon which the apparatus 10 is mounted to a vehicle having an appropriate hitching device, and transporting the apparatus 10 to the desired location.

It will then be necessary to couple the apparatus 10, and in particular the main supply line 44, to a water source, so as to provide water to the washing unit 40. (Assuming water is to be sprayed onto the produce from both above and below, each of the shut-off valves 50 will be turned to the on position.) It will further be necessary to couple the apparatus 10 to an appropriate power source (not shown), such as a portable generator, which power source will power the conveyors located on each of the loading section 12, washing section 14, ascending section 16, and dumping section 18. Before use of the apparatus 10 can begin, it is finally necessary to position each of the loading section 12, ascending section 16, and dumping section 18 at the desired angles for optimal convenience—and to place a receptacle 39 below the terminus of the dumping section 18.

The next step will be to place individual pieces of produce into the baskets 26 at some point along the loading section 12, or even along the washing section 14 before the washing unit 40. If the produce is lettuce, it will be preferred to remove the core of the lettuce head 34 prior to placing it in the baskets 26, so as to provide for a more effective washing of the lettuce head 34. As the produce enters the washing unit 40, it will be exposed to a water spray both from above and below, via spray nozzles 42 and 42a. From the top, the spray will strike the top portion of the produce located in the baskets 26. From the bottom, the spray will pass through the returning, inverted baskets located on the bottom of the washing section 14, and will strike the bottom portion of the produce located in the baskets 26.

Upon exiting the washing unit 40, the produce will pass to the ascending section 16 and in particular to the steps 36 thereon, and will be raised to the dumping section 18. The produce will then exit the steps 36 and pass onto the conveyor belt surface 38 on the dumping section 18, and will be transported from there to be dumped into the receptacle 39 at point B.

While the invention has been particularly shown and described with reference to preferred embodiments thereof, it will be understood by those skilled in the art that the foregoing and other changes in form and details may be made therein without departing from the spirit and scope of the invention. For example, it may be possible to eliminate the loading section 12, and in effect to combine the loading section 12 and washing section 14 into a single unit. It may further be possible to eliminate either or both of the ascending section 16 and dumping section 18, so that washed produce is transported from the washing section 14 to the receptacle 39 or from the ascending section 16 to the receptacle 39.

We claim:

1. A method for washing produce comprising the steps of:
   providing a washing section having a washing unit disposed thereon so as to position spray nozzles above said washing section;
   providing a conveyor belt apparatus located on said washing section and adapted to transport produce through said washing unit from an entry point of said washing section to a terminating point of said washing section;
   wherein said conveyor belt apparatus further comprises produce receiving baskets adapted to receive said produce and to expose a top portion of said produce to spray emanating from said spray nozzles located above said washing section;
   wherein said produce receiving baskets comprises an upper ring that is dimensioned to receive a single item of said produce therein and that is open at an upper portion thereof to permit said single item of said produce to be placed therein, a base ring having a smaller diameter than said upper ring and that is open at a lower portion thereof and support members projecting from said base ring to said upper ring;
   harvesting produce from a field; placing said produce in said produce receiving baskets; passing said produce receiving baskets with said produce therein through said washing unit; and
   exposing said top portion of said produce to spray emanating from said spray nozzles located above said washing section;
   wherein said produce is lettuce.

2. The method of claim 1 further comprising the steps of:
   providing a loading section pivotally coupled to said washing section at said entry point of said washing section;
   providing a conveyor belt apparatus located on said loading section and adapted to transport produce along said loading section from an entry point of said loading section to a terminating point of said loading section and from there to said entry point of said washing section; loading said produce on said conveyor belt apparatus on said loading section; and
   transporting said produce along said loading section to said washing section.

3. The method of claim 1 further comprising the steps of:
   providing on upward angled ascending section positioned at said terminating point of said washing section, after said washing unit;
   providing a conveyor belt apparatus located on said ascending section and adapted to transport produce along said ascending section from an entry point of said ascending section to a terminating point of said ascending section; and
   transporting said produce upward along said ascending section.

4. The method of claim 3 wherein said conveyor belt apparatus located on said ascending section further comprises a plurality of steps located thereon and dimensioned to prevent said produce from falling backward as it travels upward along said ascending section.

5. The method of claim 3 further comprising the steps of:
   providing a downward angled dumping section positioned at said terminating point of said upward angled ascending section; providing a conveyor belt apparatus located on said dumping section and adapted to transport produce along said dumping section from said terminating point of said ascending section to a terminating point of said dumping section; transporting said produce along said dumping section to a terminating point of said dumping section; and
   dumping said produce from said terminating point of said dumping section into a receptacle.

6. The method of claim 1 further comprising the step of providing a trailer coupled to said washing section.

* * * * *